(No Model.)  
J. F. GEHRKE.  
SEED PLANTER.  
No. 276,388. Patented Apr. 24, 1883.
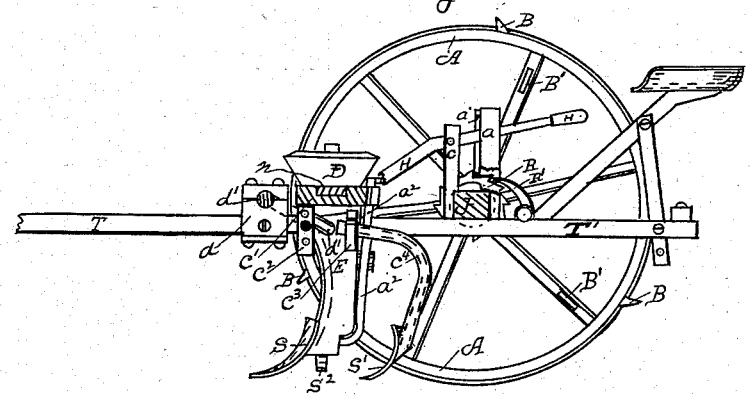
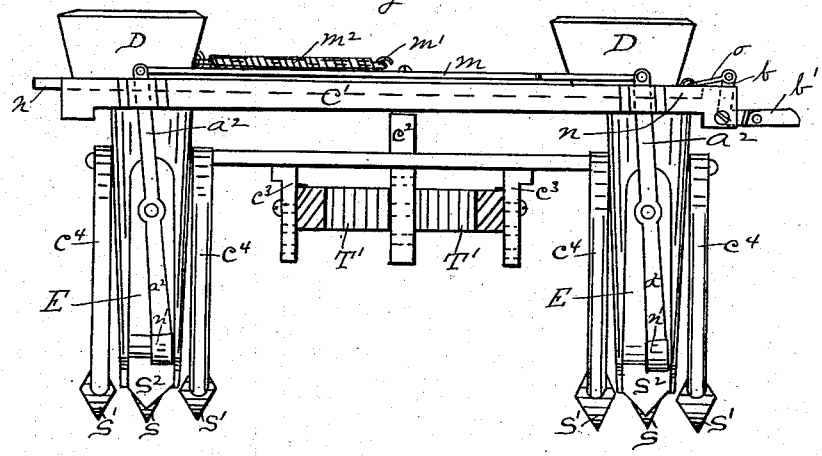

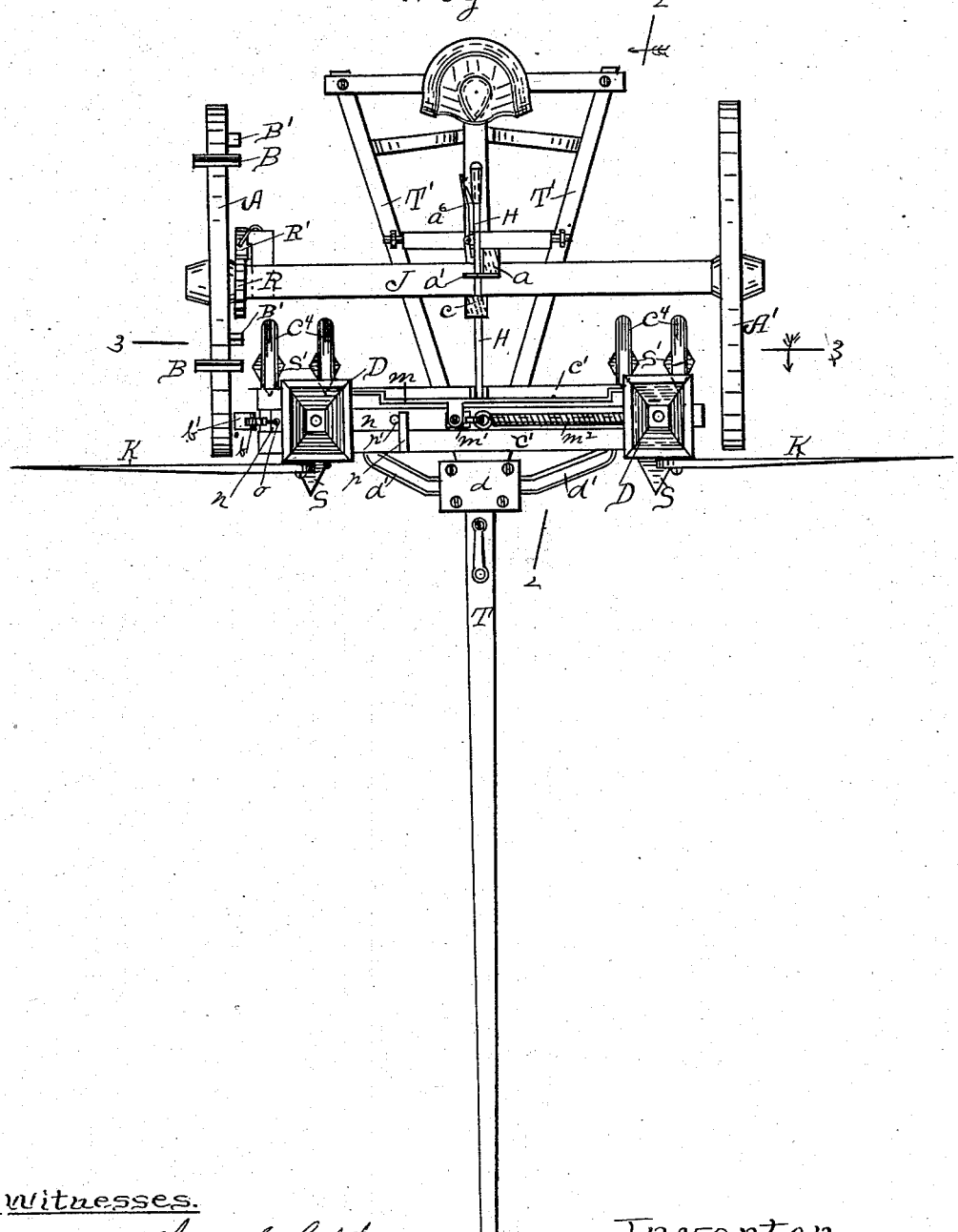

(No Model.)
J. F. GEHRKE.
SEED PLANTER.
No. 276,388. Patented Apr. 24, 1883.
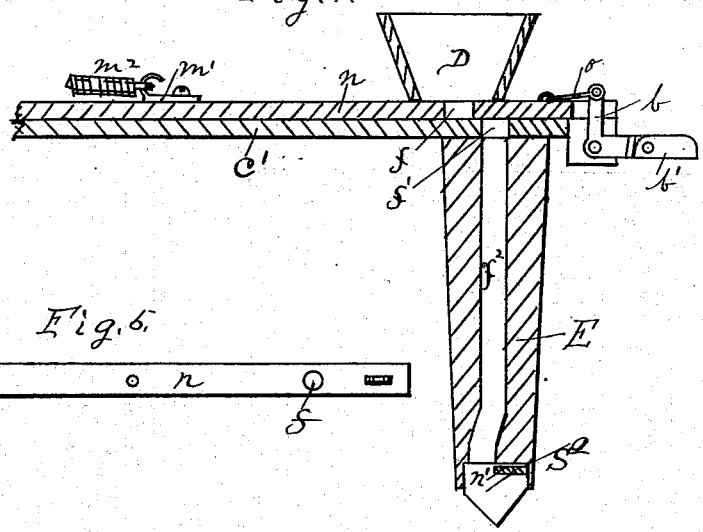
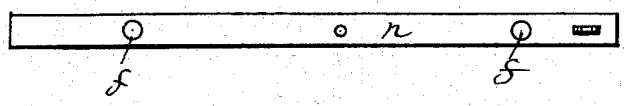
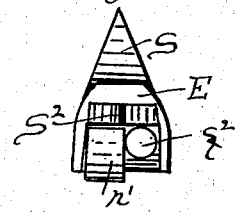
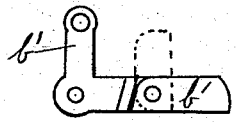
Witnesses
Thos H Hutchins
Thos J Hutchins
Inventor.
John F. Gehrke

UNITED STATES PATENT OFFICE.

JOHN F. GEHRKE, OF PLATTVILLE, ILLINOIS.

SEED-PLANTER.

SPECIFICATION forming part of Letters Patent No. 276,388, dated April 24, 1883.

Application filed October 11, 1882. (No model.)

*To all whom it may concern:*

Be it known that I, JOHN F. GEHRKE, of Plattville, in Kendall county, in the State of Illinois, have invented certain Improvements in Seed-Planters, the construction and operation of which I will proceed to explain, reference being had to the annexed drawings and the letters and figures thereon, making a part of this specification, in which—

Figure 1 is a plan view on the top; Fig. 2, a cross vertical sectional view on line 2 of Fig. 1, looking in the direction of the arrow; Fig. 3, a vertical sectional view on the line 3 of Fig. 1, looking in the direction of the arrow; Fig. 4, a vertical sectional view of the dropping-shoe and the seed-slide and hopper above it; Fig. 5, a plan view on the top of the seed-slide; Fig. 6, a view on the bottom of the dropping-shoe, and Fig. 7 a side view of the bell-crank that actuates the seed-slide.

The nature of this invention consists in the peculiar, particular, and general construction of the seed-planter, and in the manner of its operation; and the device is for the purpose of planting seed and covering it in checks or rows each way across the field automatically without the use of any wire or cord stretched across the field, and without first marking the field either way.

Referring to the drawings, J represents the axle of the machine, supported at either end by the traveling wheels A and A'. The tongue T is divided at its rear end, terminating in the diverging beams T' T', which are securely bolted to the under side of the axle, and support the seat at their rear end, and the dropping portion of the machine immediately in front of the axle. The beam $c'$ is above the tongue T, and is attached or hinged to it by means of the bent rod $d'$, having a journal on the tongue at $d$, and its inner sides hinged to said beam $c'$, so it can move vertically to elevate or lower the dropping shoes or spouts E, which is done by the lever H. (Shown in Fig. 1.) Said lever H is hinged or pivoted to said beam $c'$ about its middle, and is also pivoted or fulcrumed in the standard $c$, attached to the axle. Pressure downward on the outer end of the lever H will elevate the beam $c'$, and with it everything attached to it. A spring-pawl, $a^6$, on the side of the lever H will engage in suitable notches or holes in the standard $a$, and hold the said lever H at any place desired, so as to elevate or lower the dropping portion of the machine, supported on the beam $c'$ at any place desired.

The seed-slide $n$ lies in a channel in the upper face of the beam $c'$, running its entire length, and suitable hoppers, D, are arranged in the beam $c'$ to cover either end of the seed-slide $n$, as shown in Figs. 1 and 3 particularly. The seed-slide $n$ is provided with the ordinary holes within the hoppers for the grain to drop through at each reciprocation of the seed-slide.

Immediately below the hoppers D, and under and attached to the beam $c'$, are the dropping-spouts E, through which the seed is conveyed in the hole $f^2$, Fig. 4, to the ground. The lower ends of the dropping-spouts E are each provided with a diamond-shaped shovel, $s$, to make a suitable furrow or mark, into which the seed drops. On either side of the dropping-spouts E is arranged a beam, $c^4$ $c^4$, curved down toward the ground, and having shovels $s'$ attached thereto, as shown particularly in Figs. 1 and 3. These shovels $s'$ are for the purpose of covering the seed immediately after it has dropped from the spouts E, and also loosen up and cultivate the soil each side of the row planted, instead of hardening the ground by running a wide-rimmed wheel over the row to cover the grain, as in other planters of this character. When the grain is covered by running a wheel along over the row the ground is packed and left hard, and a channel is left for water to lie in when the ground is wet, while by this method of covering, the ground is left light and loose and a little higher over the row than at the sides of the row, so the water will not lie on the row as much as if covered by a wheel. These shovels $s'$ are held on their beams $c^4$ by means of a single bolt about through their centers, so they can rotate thereon, or on said bolt, so the point or either side of the shovels may engage with the earth to make more or less furrow and throw more or less earth on the row, and to cultivate the ground to more or less extent. The rear parts of the dropping-spouts E are provided with the levers $a^2$, pivoted at about their centers to the rear side of the dropping-spouts, as shown in Fig. 3. The lower end of these levers $a^2$ bend under the lower end of the dropping-spouts E, so that when they are oscillated either way, by means of the rod $m$, connecting their upper ends with the seed-slide $n$, as shown in Fig. 1, they will alternately open and close the opening $f^2$, (shown in Fig. 4,) said opening being turned a little to one side, as shown in said Fig. 4, to make room for the operating of said lever $a^2$. When the seed is dropped from the hopper D through the openings in the seed-slide, which correspond with the openings $f^2$ of the dropping-spouts, it is caught and held an instant until it is all resting on the foot $n'$ of the levers $a^2$, and then all dropped at once when the movement or return of the seed-slide has moved the levers $a^2$ and caused the foot $n'$ to move one side and release it. By this means the grain is dropped in a compact hill, and not strung along to some little distance, as is the case in most planters.

The reciprocation of the seed-slide $n$ is given by the bell-crank $b$ as its outer or projecting arm is engaged alternately by the lugs or projections $B'$ on the inner side of the spokes of one of the wheels A. As many or few of these lugs $B'$ may be used as desired; but a sufficient number are used to drop the grain at the proper distance apart. As these lugs engage with the horizontal arm of the bell-crank $b$ that arm is depressed and is finally released, when it returns to its normal position by means of the coil-spring $m^2$, which has one end attached to the frame of the machine stationary, and the other end to the seed-slide $n$, as shown in Figs. 1 and 4. The horizontal arm of the bell-crank $b$ is constructed in two parts, the part $b'$, Fig. 7, being hinged to the other part, so it may turn up, as shown in the dotted lines, for the purpose of permitting the lugs $B'$ to pass when the wheel A turns backward. The wheel A has its periphery provided with floats B to enter the ground and prevent the wheel from sliding on the ground, and may be as numerous or few as desired. The inner end of the hub of the wheel A is provided with a ratchet, R, provided with a pawl, R', attached to the axle J, so as to prevent the wheel A from turning backward when it is not desired. The projecting fingers $k$ are for the purpose of assisting to start the machine right, so it will plant opposite a row previously planted.

When it is desired to start, the machine is so set that the finger $k$ will be directly over the hill of a row last planted, and the wheel A is rotated until a lug $B'$ is in contact with the bell-crank $b$. The machine then moves forward and will drop all the way across the field directly opposite the hills dropped in the last row planted.

This machine is intended, as has been shown, to be a seed-planter and a cultivator combined—that is, to plant and cultivate the row planted at the same time, leaving the ground loose, and not packed or depressed over the row or seed planted, and consequently free of weeds to choke the young plants when they first appear. It also dispenses with the use of a person, or a check-row wire or cord, to actuate the seed-slide, and where the ground is in any kind of proper shape to receive the seed it will drop the grain as accurately in check-rows as can be done with a check-row wire or cord which slackens and stretches, so the hills will sometimes be dropped several feet out of line. The floats B leave a mark, so that as the machine is traveling along it can be easily seen whether it is dropping opposite the planted hills or not. If not, it can be stopped and set right at any time. The posts or stops $C^2$ and $C^3$ are provided with a series of holes, and are attached to the frame T' under the seed-slide, and are for the purpose of supporting the said dropping device, so the shovels $s$ and $s'$ will run in the earth at any desired depth, so the seed may be planted deep or shallow.

The lower end of the dropping-spout E is provided with a vertical shovel, $s^2$, immediately in front of the opening $f^2$, as shown in Figs. 4 and 6, for the purpose of clearing the furrow immediately in front of the grain as it drops.

The seed-slide is prevented from reciprocating too far backward by means of the stop $r$, attached to the beam $c'$, and the pin $r'$ on the top of the seed-slide, as shown in Fig. 1.

Having thus described my invention, what I claim as new, and desire to secure by Letters Patent, is as follows, to wit:

The combination of the wheel A, having the lugs $B'$ and floats B, wheel $A'$, axle J, split tongue T, beam $c'$, seed-slide $n$, dropping-spout E, having the bent opening $f^2$, shovel $s$, and clearing-shovel $s^2$, seed-arresting levers $a^2$, spring $m^2$, connecting-rod $m$, plow-beams $c^4$, swiveled shovels $s'$, hoppers D, bell-crank $b$, having the joint $b'$, bent rod $d'$, hinged in the box $d$, and lever H, all adapted to operate as and for the purpose set forth.

JOHN F. GEHRKE.

Witnesses:
THOS. H. HUTCHINS,
WM. J. HUTCHINS.